W. C. KING.
DISK HARROW.
APPLICATION FILED NOV. 13, 1909.
977,099.
Patented Nov. 29, 1910.
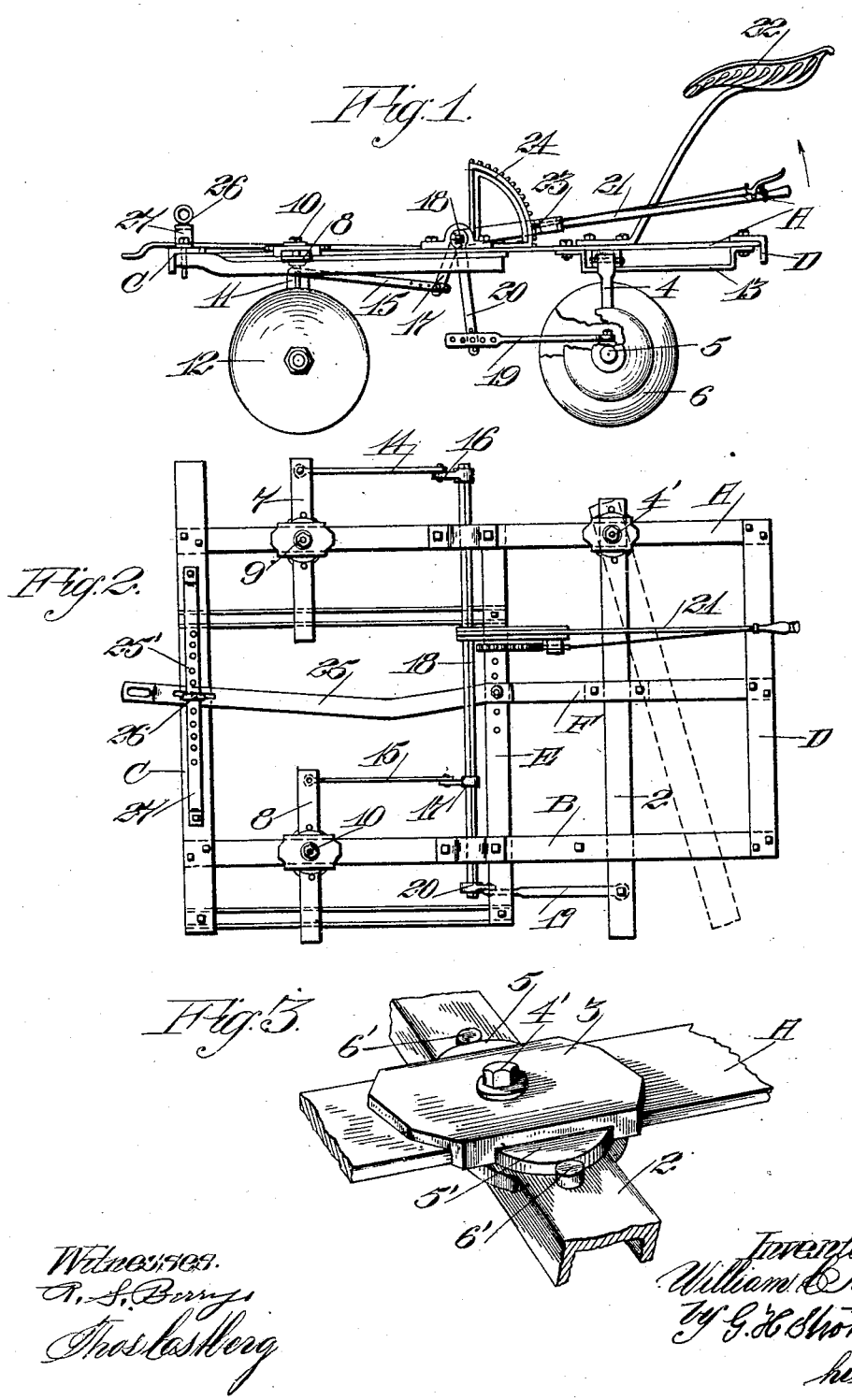

UNITED STATES PATENT OFFICE.

WILLIAM C. KING, OF CAMPBELL, CALIFORNIA, ASSIGNOR, BY DIRECT AND MESNE ASSIGNMENTS, OF ONE-HALF TO THOMAS A. CROW AND ONE-HALF TO LAURA A. CROW, BOTH OF SAN JOSE, CALIFORNIA.

DISK HARROW.

977,099.  Specification of Letters Patent.  Patented Nov. 29, 1910.

Application filed November 13, 1909. Serial No. 527,832.

*To all whom it may concern:*

Be it known that I, WILLIAM C. KING, a citizen of the United States, residing at Campbell, in the county of Santa Clara and State of California, have invented new and useful Improvements in Disk Harrows, of which the following is a specification.

My invention relates to apparatus for cultivating the ground, of that class known as "disk harrow".

It consists in the combination of mechanism, and in details of construction which will be more fully explained by reference to the accompanying drawings, in which—
Figure 1 is a side view of the invention. Fig. 2 is a plan view of the frame of the machine. Fig. 3 is a detail in perspective of a pivotal bearing.

The frame of my machine consists of side bars A and B, and transverse front and rear end bars C and D bolted thereto to form a rigid rectangular structure. A transverse bar E extends across the frame near its center, the ends of which are secured to the side bars A—B, and an intermediate longitudinally disposed bar F has one end fastened to the bar E and the other end secured to the rear end bar D. A transverse channel-bar 2 is pivotally mounted on the side bar A at a point near its rearward end, in such manner that one end of the bar 2 may be oscillated back and forth. The pivotal connection or bearing of the bar 2 consists of a plate 3 having downwardly projecting flanges on each side, which bear against the sides of the bar A, and a bolt 4' which passes through the plate 3, side bar A and the swinging bar 2. A segmental projection 5' extends from each side of the plate 3, as shown in Fig. 3, the arc of the segments being on a radius struck from the center of the swivel bolt or pin 4'. The under side of the segments bear upon the upper side of the swinging bar 2, and upwardly projecting pins 6'—6' on the bar 2, are adapted to bear against the faces of the segments 5'—5', in such manner as to be in constant contact therewith and thus relieve the bolt 4' of the greater part of the transverse strains that are directed upon it.

From the under side of the pivoted bar 2, arms or standards 4 extend downwardly, and in their lower ends are journal-boxes within which a shaft 5 is turnable. Upon this shaft a series of concavo-convex disks 6 are fixed; these disks being of any suitable or desired number, and extending across the machine from one side to the other, as shown in my former patents, dated September 25, 1906, No. 831,789, January 29, 1907, No. 842,671, and April 6, 1909, No. 917,455.

Upon the front portion of the side frames A and B, transverse bars 7 and 8 are pivotally mounted at their centers, as at 9—10, in the same manner as described in reference to the bar 2, and shown in Fig. 3. These bars 7 and 8 have standards 11 secured thereon, which extend downwardly, and upon these standards are supported the shafts of two independent series of plow disks 12, only one of which is here shown. The front bars 7 and 8 with their shafts and disks are independently turnable, with the bolts at 9 and 10 as a center of turning.

The rear bar 2, with its shaft and disks, is continuous, and is turnable about the axis 4' as its center of oscillation; consequently the outer end of the bar 2 describes an arc in its travel, so that the end of the shaft 5 and the disks 6 upon that side are moved in a corresponding arc, while the ones contiguous to the pivot point are turned in unison with the outer ones, but have a very small absolute travel. The outer end of the bar 2 is supported in a stirrup 13 on the under side of the bar B.

The swiveled bars, both front and rear, are all operated in unison as follows: The forward bars 7—8 have connecting rods or pitmen 14—15 which extend rearwardly and connect with downwardly projecting rocker-arms 16—17 mounted on a shaft 18 which is journaled in boxes upon the frame A and B. A connecting rod 19 extends from the rear axle 5 forward, and connects with a rocker-arm 20 projecting downwardly from the outer end of the shaft 18. The connecting rods 14 and 15, connect to the bars 7—8 on the same relative sides of the pivotal points 9 and 10, so that by rocking the shaft 18 the bars 7 and 8 will be turned in the same direction, and as the disks 12 travel therewith, the angle at which they enter the ground will be substantially the same.

The rear axle 5 and disks 6 being connected to the shaft 18 at the opposite side of its axis from that of the forward disks, the direction of the angle at which the disks 6 enter the ground will be opposite that of the forward disks, thus operating in the same manner, and accomplishing the same results as the machine described in Letters Patent No. 917,455, dated April 6, 1909, and issued to myself.

In order to rotate the shaft 18 and produce the described movements of the forward and rearward oscillating bars and their connections, I have shown a hand lever 21, which is keyed or otherwise fixed to the shaft 18, and having its upper end within easy reach of the operator, who may ride upon the seat as shown at 22. The lever 21 is fitted with the ordinary spring pawl 23, and toothed segment 24, commonly used as a means of setting the lever 21 in any desired position in its line of travel.

In my present apparatus I have shown the draft bar 25 as connected to the transverse bar E and extending forward over the bar C, and held in place on the latter by means of a rod 26, which passes through a stirrup 27, the draft bar 25 and the frame C. A number of openings 25' are formed in the frame C and stirrup 27, so that the position of the forward end of the draft bar can be adjusted.

The connecting rods 14—15 and 19 are each provided with a series of openings through which the bolts joining the connecting rods with their respective rocker-arms may be inserted so as to adjust the length of the connecting rods.

The general operation of the machine is apparent from the foregoing description, and need not be further described here.

The particular construction and operative features of this machine lie in the pivotal connections or bearings of the oscillating bars 7, 8 and 2, which are so designed as to be substantial, and to provide a distribution of the strains that are brought to bear upon the pivotal points.

The simplicity of the construction of the frame-work and pivotal bearings constitute one of its greatest advantages.

Having thus described my invention what I claim and desire to secure by Letters Patent is—

1. The combination in a plow, of a main rectangular frame with a fixed transverse bar, a draft bar pivoted, and adjustable upon the transverse bar, and with relation to the front frame bar, plow disk carrying shafts having vertical hangers, and channel iron top bars, plates having downwardly turned lugs clasping the side frame bars and convex segments upon opposite sides, guide pins fixed in the channel bars, and in contact with the segments, and a central pivot pin.

2. The combination in a plow, of a rectangular main frame and centrally located draft bar, independent plow disk carrying shafts, channel iron bars to which the shaft hangers are fixed, plates pivoted through the main frame and channel bars, said plates having lugs clasping the main frame bars, and convex segments projecting over the channel bars, and guide pins or stops on the channel bars, in contact with the segments.

3. The combination in a disk plow, of a main frame, channel iron bars with dependent hangers, plow disks fixed to shafts which are journaled in the hangers, pivot pins about which the channel bars and plows are turnable with relation to the main frame, supplemental plates having lugs clasping the edges of the main frame bars, with convex segments extending over the channel iron bars, and pins on the channel iron bars turnable in contact with the segments.

4. A disk plow having a main frame, channel iron bars with hangers in which the plow shafts are journaled, pivot pins about which the plow-carrying frames are turnable with relation to the main frame, a reinforce for the pivot pins, consisting of plates through which the pivot pins pass, said plates having lugs clasping the main frame side bars and convex segments, and pins in the channel bars which travel against the segments when the plow frames are turned.

5. In a plow having independent series of plowing disks turnable about a vertical axis, a swivel joint including an angle plate clasping the main frame side bar, a channel bar from which the disk hangers depend, a pivot pin passing through said three members, and a reinforce for said pin consisting of pins projecting from the channel bar, and circular segments projecting from the angle plate between the pins.

6. The combination in a disk plow, of a main frame, gang bars with dependent hangers, plow disks fixed to shafts which are journaled in the hangers, pivot pins about which the gang bars and plows are turnable with relation to the main frame, supplemental plates having lugs clasping the edges of the main frame bars, with convex segments extending over the gang bars, and pins on the gang bars turnable in contact with the segments.

7. In a plow having independent series of plowing disks turnable about a vertical axis, a swivel joint including an angle plate clasping the main frame side bar, a gang bar from which the disk hangers depend, a pivot pin passing through said three members and a reinforce for said pin consisting of pins projecting from the gang bar, and circular segments projecting from the angle plate between the pins.

8. A disk plow having a main frame, a channel iron bar with hangers in which a plow shaft is journaled, a pivot pin about which the plow carrying bar is turnable with relation to the main frame, a reinforce for the pivot pin, consisting of a plate through which the pivot pin passes, said plate having lugs clasping the main frame side bar and convex segments, and pins in the channel bar which travel against the segments when the plow carrying bar is turned.

In testimony whereof I have hereunto set my hand in the presence of two subscribing witnesses.

WILLIAM C. KING.

Witnesses:
 EDUARD A. PAGEL,
 ARTHUR ERNST.